United States Patent [19]

Coran

[11] Patent Number: 5,053,450

[45] Date of Patent: Oct. 1, 1991

[54] ELASTOMER COMPOSITIONS

[75] Inventor: Aubert Y. Coran, Akron, Ohio

[73] Assignee: Monsanto Company, St. Louis, Mich.

[21] Appl. No.: 422,167

[22] Filed: Oct. 16, 1989

[51] Int. Cl.$^5$ .................. C08L 9/02; C08L 13/00; C08L 15/02

[52] U.S. Cl. .................. 524/506; 524/517; 524/519; 524/520; 524/523; 524/227; 524/230

[58] Field of Search ............... 523/351; 525/227, 230; 524/523, 520, 521

[56] References Cited

U.S. PATENT DOCUMENTS

| | | | |
|---|---|---|---|
| 3,873,494 | 3/1975 | Lewis | 260/42.37 |
| 4,286,023 | 8/1981 | Ongchin | 428/516 |
| 4,338,413 | 7/1982 | Coran et al. | 525/66 |
| 4,591,615 | 5/1986 | Aldred et al. | 525/179 |
| 4,656,219 | 4/1987 | Oyama et al. | 524/481 |
| 4,687,810 | 8/1987 | Coran | 525/74 |
| 4,725,637 | 2/1988 | Fernyhough et al. | 524/271 |

FOREIGN PATENT DOCUMENTS 194030  9/1986  European Pat. Off. .
2487369  1/1982  France .

OTHER PUBLICATIONS

Abstract of Japanese Patent 62-53353, 3/87, Takemura et al.
Abstract of Japanese Patent 62-103,113, Otsuka, 5/87.
Blends of Polyacrylate Rubber . . . 1. Antal et al. Int'l Pol. Sci. & Technol. 5, 11 (1978).

*Primary Examiner*—Allan M. Lieberman
*Attorney, Agent, or Firm*—Gordon B. Seward

[57] ABSTRACT

Compositions of acrylic rubber and another rubber which can be nitrile rubber, hydrogenated nitrile rubber, fluoroelastomer, silicone rubber, or fluorosilicone rubber are described, in which the acrylic rubber is at least partially crosslinked. The compositions are millable and processable and, by the addition of curatives for the nitrile rubber, hydrogenated nitrile rubber, fluoroelastomer, silicone rubber, or fluorosilicone rubber, can be further crosslinked to become vulcanizates which exhibit excellent resistance to the effects of hot air, hot oil, and ozone.

12 Claims, No Drawings

ELASTOMER COMPOSITIONS

BACKGROUND OF THE INVENTION

This invention relates to elastomer compositions and to a method for making them. The blends comprise acrylic rubber and another elastomer which can be nitrile rubber, hydrogenated nitrile rubber, a fluoroelastomer, a silicone rubber or a fluorosilicone rubber. The elastomer compositions all have excellent resistance to the degrading effects of oil and heat.

It is known to blend different elastomers in an effort to obtain a combination of the beneficial properties of each; however, such blends often have properties which are, in fact, inferior to those of the components, because of incompatibility between different pairs of elastomers. Differences in viscosity in the unvulcanized state, in surface energy and in vulcanization rate can produce heterogeneous mixtures which are said to be "technologically incompatible." Thus, simple blends of two or more dissimilar elastomers often fail to achieve the desired combination of the good properties of each.

Elastomers which possess superior properties with regard to service temperature and low oil-swell are often referred to as "extreme-service" elastomers. Typical of these materials are fluorocarbon rubbers, fluorosilicone rubbers and silicone rubbers. A principal drawback of these materials is their high cost.

Other elastomers, such as nitrile rubber, have excellent oil-swell properties, but do not have high service temperatures. Still others, such as acrylic rubber, have fairly high service temperatures as well as very good oil resistance.

A desirable result, therefore, is a blend of elastomers which can produce a composition which has the properties of resistance to both heat and oil at a reasonable cost, yet is so produced as to minimize the technological incompatibility often associated with blends of dissimilar elastomers.

BRIEF SUMMARY OF THE INVENTION

It has now been discovered that the desirable properties of oil-resistance and high service temperature in a technologically compatible blend of elastomers can be realized in a composition which comprises from 5 to 75 parts by weight of acrylic rubber and, correspondingly, 95 to 25 parts by weight of another elastomer which is nitrile rubber, hydrogenated nitrile rubber, a fluoroelastomer, a silicone rubber or a fluorosilicone rubber, in which the acrylic rubber is in the form of vulcanized or crosslinked particles, of an average diameter below 50 micrometers ($\mu$m). This composition is vulcanizable and millable, and can be further compounded with vulcanizing agents for the other rubber and vulcanized into useful objects.

Such a composition can be prepared by first forming a mixture of the acrylic rubber and the other rubber in the desired ratio, and then masticating the mixture in the presence of an agent which will crosslink the acrylic rubber but not the other rubber, at vulcanization temperature for the acrylic rubber, for a sufficient time to achieve at least partial vulcanization of the acrylic rubber. In a subsequent step, the mixture so produced can then be combined with a vulcanization agent for the other rubber, and the mixture can then be shaped and vulcanized, for example, in a mold. The finished product of this subsequent step exhibits physical properties, such as tensile strength, which are superior to the properties of similar compositions made by simply blending the acrylic rubber with the other rubber and vulcanizing the blend.

PREFERRED EMBODIMENTS OF THE INVENTION

The acrylic rubbers of the invention are elastomeric polymers or copolymers of one or more alkyl acrylate monomers and another monomer containing crosslinking sites. These acrylic rubbers (or elastomers) include vulcanizable polymers of ethyl acrylate or other acrylates (designated by ASTM as "ACM"), copolymers of ethyl acrylate or other acrylates with acrylonitrile (designated by ASTM as "ANM") and copolymers of ethylene, an alkyl acrylate and a cure-site monomer such as an alkenoic acid (designated as "EACM"). These three types of acrylic elastomers are discussed in detail in the *Encyclopedia of Polymer Science and Engineering*, (2nd Edition) Wylie-Interscience, Vol. 1, pages 306–334.

The preferred acrylic elastomers of the invention are those polymers and copolymers from one or more alkyl acrylate monomers together with another monomer containing crosslinking sites; the ACM elastomers. These elastomers are often copolymers from ethyl acrylate together with a higher alkyl acrylate and a chlorine-containing monomer. The latter provides chlorine crosslinking sites, whose reactivity varies depending upon the location of the chlorine atom in the monomer. Other "crosslinking-site" monomers provide reactive groups such as epoxy, or hydroxyl groups. Along with ethyl acrylate, other preferred acrylate monomers include n-butyl acrylate, 2-methoxyethyl acrylate and 2-ethoxyethyl acrylate. Commercially available acrylic elastomers of the ACM type available in the United States are listed in the Rubber World Blue Book (1989) on pages 404 and 405.

Ethylene/acrylic elastomers are less preferred species of acrylic elastomers, primarily because their ethylene content causes them to have a lower oil-resistance. However, they do possess excellent resistance to heat aging, and are useful in the compositions of the invention. EACM elastomers are supplied commercially by du Pont under the trademark VAMAC. Some of the commercially available EACM grades are listed in the 1989 Rubber World Blue Book on page 411.

Nitrile rubber (NBR) used in the compositions of the invention is a copolymer from 1,3-butadiene or isoprene and acrylonitrile. The monomer 1,3-butadiene is preferred. The relative proportions of these monomers determine some of the properties of the polymers. Typical NBR has an acrylonitrile content of 50% or less, usually at least 25%. Higher levels of acrylonitrile result in polymers which have greater oil resistance; lower levels of acrylonitrile result in softer, more flexible rubbers. Commercially available NBR types are listed in the 1989 Rubber World Blue Book on pages 434–454. Hydrogenated NBR elastomers, in which the level of the olefinic unsaturation in the chains has been reduced, exhibit improved resistance to heat-aging, and are also useful in the compositions of the invention.

Fluoroelastomers used in the compositions of the invention are rubbery polymers and copolymers from fluorocarbon monomers. These materials are described in the Wylie-Interscience *Encyclopedia of Polymer Science and Engineering*, (2nd Edition) in Volume 7 at pages 257–269. These elastomers are characterized by their excellent resistance to a variety of chemicals, oils and fuels, and their flexibility and service life at extreme temperatures. Typical fluoroelastomers are copolymers from vinylidene fluoride with other fluorocarbon, chlorofluorocarbon or hydrocarbon monomers or other cure-site monomers. A list of commercially available fluoroelastomers can be found in the 1989 Rubber World Blue Book on pages 424-430.

Silicone elastomers used in the compositions of the invention are rubbery materials, usually based on polydimethylsiloxanes which contain reactive groups as cure sites. Based on the nature of these cure sites, the crosslinking agent and optimum time and temperature for crosslinking are determined. A detailed discussion of silicone elastomers can be found in the Wylie-Interscience *Encyclopedia of Polymer Science and Engineering*, (2nd Edition) in Volume 15 at pages 271–289. A list of commercially available silicone elastomers can be found in the 1989 Rubber World Blue Book at pages 472–480. While many of the cure systems for silicone elastomers are active at room temperature, and often used in adhesives and sealants, other such elastomers have heat-curing systems which require elevated temperatures for crosslinking. A typical silicone elastomer compound will include a substantial amount of filler, usually a silica filler.

Fluorosilicone elastomers can be considered a special variation of silicone elastomers which contain fluorocarbon substituents. Some commercially available fluorosilicone elastomers are included in the Blue Book entries for fluoroelastomers. As may be assumed, these materials lend some of the qualities of a fluoroelastomer to the basic properties of the silicone materials.

The compositions of the invention feature a dispersion of vulcanized particles of acrylic elastomer in a continuous matrix of another elastomer, selected from the elastomers listed above. That is, the matrix elastomer forms the continuous phase and the acrylic elastomer the disperse phase in a two-phase system. The particles of the acrylic elastomer are small, having an average diameter below 50 micro meters ($\mu$m). Desirably, their average diameter is below 20 $\mu$m, and preferably it is below 10 $\mu$m. It is thought that the vulcanized state of these acrylic elastomer particles enables them to retain their integrity in the dispersion, and reduces their tendency to agglomerate. Experience has shown that particles much larger than about 50 $\mu$m tend to act as flaws in the final product, thus adversely affecting some of their physical properties, such as tensile strength or tear strength.

The compositions of the invention contain acrylic elastomer and another elastomer selected from nitrile rubber, hydrogenated nitrile rubber, fluoroelastomers, silicone rubber and fluorosilicone elastomers, in a proportion, based on 100 total parts by weight of both elastomers, so that at least 5 parts by weight, but no more than 75 parts by weight of dynamically vulcanized ACM and 25 to 95 parts by weight of the other elastomer is present. Preferably, the acrylic elastomer makes up from 25 to 65 parts, with correspondingly, 75 to 35 parts of the other elastomer; more preferably, the compositions contain 40 to 60 parts of the acrylic elastomer and 60 to 40 parts of the other elastomer. Within the above proportions, the compositions are capable of exhibiting the good qualities of both component elastomers. It is understood that the term other elastomer can mean a mixture of other elastomers as herein selected.

The compositions of the invention can be prepared advantageously by a process which generally involves forming an intimate mixture of the elastomers in the recommended proportions, and masticating the mixture, in the presence of a cross-linking agent for the acrylic elastomer (but not for the other elastomer), at a crosslinking temperature for the acrylic elastomer, for a time sufficient to achieve at least partial crosslinking of the acrylic elastomer. This process will produce a dispersion of (at least partially) crosslinked acrylic elastomer dispersed in a continuous matrix of the other (uncured) elastomer. Then, if desired, in a subsequent step, crosslinking agent for the other elastomer can be added, and the composition can be shaped and the final crosslinking accomplished. Shaping can be by calendering, extrusion or molding, followed by curing or crosslinking, usually with the application of heat, often under pressure.

The suitable crosslinking agent for the acrylic elastomer will depend, of course, on the nature of the reactive groups on the acrylic polymer. With ACM type acrylic elastomers, chlorine cure sites are most often used. The nature of the chlorine-containing monomer determines the structure of the side-chain which contains the chlorine atom; in turn, this structure controls the relative activity of the chlorine atom. And, depending on this activity, any of a variety of crosslinking systems can be employed. Among these systems are red lead-thiourea, blocked diamine, ammonium benzoate, soap-sulfur, trithiocyanuric acid and bismaleimide-sulfur. If other cure-site monomers are used, appropriate crosslinking agents can be selected. For example, ACM elastomers with epoxy cure sites can be crosslinked using polyamines, ammonium salts, blocked diamines, red lead-thiourea, zinc dimethyl dithiocarbamate or electron-beam radiation. Hydroxyl cure sites can be reacted with anhydrides or hexakis (methoxymethyl) melamine to give crosslinked ACM elastomers. The manufacturer's recommendations and limited experimentation can provide the type and amount of crosslinking system which is best. Of course, the nature of the other elastomer selected for use in the compositions of the invention may proscribe a certain crosslinking system or cure site, since the crosslinking systems for the different elastomers should not interfere with each other.

Also, in selecting the curing system for the ACM, one must be careful not to select a curative for the ACM which also can crosslink the other elastomer under the conditions of the dynamic vulcanization of the ACM lest the entire composition be sufficiently crosslinked to prevent processability, fabricability, etc. of the composition after the dynamic vulcanization of the ACM, before the final shaping, forming, molding and curing of said composition. For example, it is better to use the soap-sulfur system to cure the ACM in the presence of a general purpose fluoroelastomer (e.g., Viton GLT) than to use a diamine or diamine generator to dynamically cure the ACM in the presence of the said general purpose fluoroelastomer. On the other hand, it is advantageously effective to use the diamine or diamine generator to dynamically vulcanize the ACM in the presence of NBR or HNBR.

Crosslinking of EACM elastomers is usually accomplished with primary diamines. Methylene dianiline is often recommended, together with a guanidine accelerator such as diphenylguanidine, diorthotolylguanidine or tetramethylguanidine.

Other compounding ingredients will be used in the compositions of the invention as dictated by the nature of the elastomers employed and the requirements of the final compositions. Optionally, therefore, oils, softeners, plasticizers, fillers, antidegradants and colorants can be added to one or both elastomers, as well as crosslinking agents for each.

Mixing of the elastomers, admixture of the crosslinking agents and other compounding ingredients, and mastication of the mixture during crosslinking of the acrylic elastomer can all be performed on conventional rubber-mixing equipment, such as Banbury mixers, Brabender mixers, rubber mills and mixing extruders. Conventional mixing rates, temperatures and procedures are employed.

A more complete understanding of the invention can be obtained by reference to the following examples, in which all amounts are expressed as parts by weight and all temperatures are in degrees celsius unless otherwise indicated.

PREFERRED EMBODIMENTS OF THE INVENTION

EXAMPLE 1

In order to evaluate compositions of the invention containing ACM and NBR, the following experiments were performed.

Black-filled masterbatches of NBR (Krynac® 34.5 from Polysar) and ACM (Hycar® 4052 from B. F. Goodrich Chemical) were prepared, according to the recipes of Table I, by using a size 00 Banbury mixer by usual procedures. The Krynac 34.5 was chosen because of its exceptionally good hot-air resistance. The choice of Hycar 4052 was a compromise between low-temperature flexibility and resistance to degradation in hot air. The choice of carbon black (N-326) was for strength and toughness in the final vulcanizate.

TABLE I

| RECIPES FOR BLACK MASTERBATCHES (PARTS BY WEIGHT) | | |
|---|---|---|
| | NBR BLACK MASTERBATCH | ACM BLACK MASTERBATCH |
| Krynac 34.5 (NBR) | 100 | — |
| Hycar 4052 (ACM) | — | 100 |
| N-326 Carbon Black | 50 | 50 |

The masterbatches prepared above were then combined in different proportions; then curatives and other additives, which can effect so-called dynamic vulcanization of the ACM.

The rubber masterbatches were thoroughly mixed in a Brabender mixer (@ 80 rpm) and then dynamically vulcanized at elevated temperatures (about 200° C.) in accordance with the recipes and procedures of Table II. The recipes were reduced to batch size, each batch containing 66 g of rubber masterbatch (the combined weight of the rubbers and carbon black being 66 g in each case). After the masterbatches were blended, the potassium stearate and spider sulfur were added (also in accordance with Table II). During dynamic vulcanization, the mixing torque increased. When the torque-vs-time profile became level the dynamic vulcanization was assumed to be complete. This generally required about eight minutes. After the completion of the dynamic vulcanization, the Stangard® 500 antioxidant package was added. It is essential that the Stangard 500 antidegradant be added after the completion of the dynamic vulcanization of the ACM since it would otherwise interfere with the vulcanization of the ACM. After the dynamic vulcanization process was finished, in each case, the millable dynamic vulcanizate was removed from the mixer and cooled on a tight roll mill.

Each composition was placed again in the Brabender mixer, this time, however, at a lower temperature. Curatives for the NBR (Zinc oxide, stearic acid, sulfur and 2,2'-dithiobisbenzothiazole) were then added and mixed at lower temperatures (set temperature of 80° C.). The compositions were then vulcanized at 160° C. for a time corresponding to optimum cure time (in the Monsanto Oscillating disc rheometer). The overall recipes for the compositions are given in Table III. Note that ACM control stocks (cured at optimum-cure time at 180° C.) are also listed in Table III (stocks 9, 10, and 11).

TABLE II

| GENERAL RECIPE AND PROCEDURE FOR BLACK COMPOSITIONS | | |
|---|---|---|
| | INGREDIENT | AMOUNT |
| First mix: | NBR Black Masterbatch | P (Variable) |
| | ACM Black Masterbatch | Q (Variable) |
| | (P + Q = Enough to make 100 parts of Polymer) | |
| Then add and mix: | Potassium stearate | 3 parts/100 parts ACM |
| | Spider sulfur | 0.3 parts/100 parts ACM |
| Dyn. Vulc. (190–200° C.) | | |
| Then add: | Stangard 500 (AO) | 2.5 parts/100 parts (ACM + NBR) |
| Then mix @ 100–120° C. | Spider Sulfur | 1.2 parts/100 parts NBR |
| | Zinc oxide | 2.5 parts/100 parts NBR |
| | Zinc stearate | 1.0 parts/100 parts NBR |
| | MBTS (Accelerator) | 2.5 parts/100 parts NBR |

(Vulcanize in mold at 160° C. to optimum cure time estimated by the oscillating disc rheometer.)

TABLE III

| OVERALL RECIPES AND EVALUATION RESULTS FOR BLACK STOCKS | | | | | | | | | | | |
|---|---|---|---|---|---|---|---|---|---|---|---|
| Stock | 1* | 2 | 3 | 4 | 5 | 6 | 7 | 8 | 9* | 10* | 11* |
| add before dyn. vulcanization: | | | | | | | | | | | |
| NBR | 100 | 90 | 80 | 70 | 60 | 50 | 40 | 30 | — | — | — |
| ACM | — | 10 | 20 | 30 | 40 | 50 | 60 | 70 | 100 | 100 | 100 |
| N-326 | 50 | 50 | 50 | 50 | 50 | 50 | 50 | 50 | 50 | 50 | 50 |
| Potas. stearate | — | 0.3 | 0.6 | 0.9 | 1.2 | 1.5 | 1.8 | 2.1 | 3.0 | 3.0 | 3.0 |
| Spider sulfur | — | 0.03 | 0.06 | 0.09 | 0.12 | 0.15 | 0.18 | 0.21 | 0.30 | 0.30 | 0.30 |
| add after dyn. vulcanization: | | | | | | | | | | | |
| Stangard 500 | 2.5 | 2.5 | 2.5 | 2.5 | 2.5 | 2.5 | 2.5 | 2.5 | — | 2.5 | — |
| Spider sulfur | 1.20 | 1.08 | 0.96 | 0.84 | 0.72 | 0.60 | 0.48 | 0.36 | — | — | — |
| Zinc oxide | 2.50 | 2.25 | 2.00 | 1.75 | 1.50 | 1.25 | 1.00 | 0.75 | — | — | 2.5 |
| Zinc stearate | 1.1 | 0.9 | 0.8 | 0.7 | 0.6 | 0.5 | 0.4 | 0.3 | — | — | 1.0 |
| MBTS | 2.50 | 2.25 | 2.00 | 1.75 | 1.50 | 1.25 | 1.00 | 0.75 | — | — | — |
| Original Properties: | | | | | | | | | | | |

TABLE III-continued
OVERALL RECIPES AND EVALUATION RESULTS FOR BLACK STOCKS

| Stock | 1* | 2 | 3 | 4 | 5 | 6 | 7 | 8 | 9* | 10* | 11* |
|---|---|---|---|---|---|---|---|---|---|---|---|
| Hardness, A scale | 72 | 71 | 70 | 69 | 68 | 69 | 67 | 66 | 64 | 61 | 65 |
| Ult. ten. str., MPa | 30.5 | 26.7 | 23.4 | 21.2 | 17.8 | 13.7 | 10.5 | 7.1 | 11.8 | 6.5 | 11.7 |
| 100% mod., MPa | 2.4 | 2.5 | 2.6 | 2.5 | 2.4 | 2.4 | 2.1 | 2.3 | 4.0 | 2.0 | 3.5 |
| Ult. elong., % | 551 | 486 | 453 | 427 | 411 | 351 | 329 | 290 | 203 | 431 | 249 |
| Tension set, % | 3.0 | 3.0 | 3.5 | 4.0 | 4.5 | 3.5 | 5.5 | 5.5 | 3.5 | 7.5 | 4.5 |
| ASTM #3 oil resistance % vol. swell after 72 hrs @ 150° C. | 22 | 23 | 23 | 21 | 25 | — | 30 | 19 | 22 | 18 | 17 |
| Dry-heat resistance: (72 hrs @ 125° C.) | | | | | | | | | | | |
| Chg. in Hardness | 4 | 4 | 6 | 9 | 11 | 9 | 11 | 12 | 0 | 8 | 3 |
| % UTS retained | 84 | 88 | 94 | 110 | 114 | 118 | 138 | 158 | 107 | 103 | 104 |
| % UE retained | 49 | 51 | 53 | 56 | 56 | 59 | 58 | 62 | 114 | 101 | 97 |
| Ozone (25 pphm) resistance: (Hrs to failure) | | | | | | | | | | | |
| Static | 21 | 29 | 136 | 152 | 168 | 240 | >304 | >304 | >304 | >304 | >304 |
| Intermittent | 26 | 25 | 52 | 93 | 168 | 144 | >304 | >304 | >304 | >304 | >304 |
| Dynamic | 36 | 46 | 56 | 56 | 120 | 104 | >304 | >304 | >304 | — | >304 |
| ACM conc. as % of Polymer | 0 | 10 | 20 | 30 | 40 | 50 | 60 | 70 | 100 | 100 | 100 |

*Control compositions, not dynamically vulcanized.

For determining mechanical properties, hot-oil swelling resistance, and dry hot-air resistance the appropriate ASTM test in each case was used. (See ASTM D2000 or SAE J200 Classification System for Elastomeric Materials.)

Testing for resistance to ozone: Compositions were tested for ozone resistance under static, dynamic, and intermittent (static/dynamic) conditions by using an accelerated testing procedure (4). ASTM-50 specimens (D-599-61), die-cut from completely vulcanized tensile sheets, were exposed to an ozone atmosphere and the change in apparent stress at 100% strain (100% modulus) was followed as a function of exposure time. The concentration of ozone in the test cabinet was maintained at 25 +/−5 parts per hundred-million (pphm) at a temperature of 40°+/−2° C. Exposure was in increments of 16 hours followed by at least one hour of relaxation after removal from the ozone chamber (at the end of each interval) and prior to measurement of the apparent stress at 100% strain. The T-50 test pieces were maintained at 25% strain during static exposure and alternately relaxed and extended to 25% extension at a rate of 90 cycles per minute during dynamic exposure. During the intermittent test, the condition of test was alternated between 18 minutes of dynamic exposure and 102 minutes of static exposure in the extended or strained state. Ozone resistance was measured either as the number of exposure hours required to give a reduction of 30% in apparent 100% modulus or as the number of exposure hours required for the test piece to totally break apart, whichever happened first. The time required for the 30%-reduction-of-modulus criterion for failure time was determined by interpolation of data between the 16 hour test intervals. If failure occurred in the form of a total fracture (before the 30% loss of apparent stress at 100% strain), it was impossible to determine when, during the 16 hour interval, the failure had occurred. In such a case, the failure time was reported as the exposure time to reach the mid-point of the last 16-hour test-exposure interval.

Processability: It was noted that, if more than 50% of the rubber was ACM, some processing difficulty was encountered. The material developed some tendency to crumble during mixing as dynamic vulcanization progressed. However, milling at lower temperatures greatly reduced the tendency toward crumbling. ACM or its blend with another rubber has a tendency to stick to a roll and to give splitting of the band as it emerges from the mill nip (on the bottom side, below the nip). Dynamic vulcanization reduced the tendency towards mill sticking and splitting.

Mechanical Properties: The mechanical properties of the press-cured vulcanizates are shown in Table III. The ultimate tensile strength was a function of the NBR/ACM proportions. The NBR, when used alone, gave very strong, tough vulcanizates. However, as more and more ACM was incorporated into the composition, the ultimate mechanical properties of the final vulcanizates fell off. Nevertheless, the mechanical properties of the final vulcanizate were still quite good even if as much as 50% of the rubber was ACM; useful ultimate properties were obtained even if as much as 60-70% of the rubber is ACM.

The data (Table III) indicate that there was a tendency towards lower hardnesses with increasing ACM concentration. It is interesting that such a trend is not apparent with respect to the stress at 100% strain (100% modulus).

With respect to tension set, there may be a very slight tendency towards greater amounts of set as the concentration of ACM is increased. However, because of the scatter in the data, there is little significance to the trend.

Interference between compounding Ingredients: It is essential that the Stangard 500 antidegradant be added after the completion of the dynamic vulcanization of the ACM which was induced by the action of soap and sulfur. This is indicated by the comparison of the mechanical properties reported for the ACM control stock 9 of Table III with those of stock 10 which contained the antidegradant, but otherwise was the same as stock 9. Even zinc oxide/zinc stearate appeared to interfere slightly with the ACM vulcanization. The NBR vulcanization was probably not affected much by the presence of the potassium soap.

Hot-oil resistance: The oil-swelling resistance characteristics of the NBR and ACM vulcanizates are similar. It is not surprising, then, that there was little effect noted on oil swelling due to changes in the proportions of ACM and NBR. The hot-oil resistance of each of the measured compositions was indeed good.

Oxidative aging resistance: As expected, the oxidative aging resistance of each of the ACM control vulcanizates (containing no NBR) was excellent. However, the hot-air aging resistance of the NBR and any of its blends with ACM was only moderately good. Nevertheless, the final vulcanizates of the NBR/ACM blends were better with respect to hot-air resistance than was the vulcanizate containing only NBR (stocks 2–8 vs. stock 1 of Table III).

Resistance to ozone: The ozone resistance of a black-filled vulcanizate was quite good, provided that at least 30 to 40% of the rubber was ACM. If 50% or more of the rubber was ACM the composition was essentially ozone proof.

Overall assessment of the carbon black-filled compositions: Blends of carbon black-filled masterbatches of ACM with those of NBR indeed gave interesting prevulcanized curable alloys when the dynamic vulcanization procedure was used. Compositions which exhibit excellent hot-oil resistance and ozone resistance were also obtained. However, it was felt that there was much room for improvement with respect to oxidative aging resistance. As set forth in Example 2, following, studies of silica filled compositions were undertaken, dynamically vulcanized by an amine generator, but in which the final vulcanization of the NBR phase (in the mold) was accomplished by the organic peroxide/bismaleimide curing system in the presence of magnesium oxide.

EXAMPLE 2

In a similar manner, silica-filled compositions were prepared, in which ACM elastomer was dynamically vulcanized by a diamine generator, and then NBR was vulcanized with a curative combination of peroxide and bis-maleimide. The elastomers used were the same as those used in Example 1.

Masterbatches containing various amounts of silica filler (Hisil 233) in each of the two elastomers were mixed in a large Brabender mixer (generally in 250 g batches) with cam-type rotors. In each batch, 0.5 phr of A-189 silane coupler was used. Each masterbatch was mixed to a temperature of about 160° C. and then finished by blending on a tight roll mill. Masterbatches were mixed containing 10, 20, 30, 40 and 50 phr silica in ACM were prepared, as well as 20, 30, 40, 50 and 60 phr silica in NBR.

In the case of each of the compositions to be prepared and evaluated, an appropriate masterbatch of silica-filled ACM was thoroughly blended with an appropriate masterbatch of silica-filled NBR in a small Brabender mixer with cam-type rotors at 80 rpm at a temperature of about 100° to 120° C. Each blend of silica-filled (unvulcanized) ACM with silica-filled (unvulcanized) NBR was worked on a tight roll mill and then placed again into the small Brabender mixer for dynamic vulcanization. Temperatures for dynamic vulcanization were between 196° and 211° C. The rotor speed was again 80 rpm.

The hexamethylenediamine (HMD) generator, Diak #1 (du Pont's brand of HMD carbamate), was used for the dynamic vulcanization of ACM during its mixing with NBR. The Diak #1 (1.0 part per 100 parts by weight of ACM) was added during the mixing of the batch in a hot mixer for about 1–2 minutes, somewhat before the dynamic-vulcanization temperature was reached. The mixing torque reached a maximum due to dynamic vulcanization, then Stangard 500 antidegradant (5 phr, based on total polymer) was added and mixing was continued for 1–2 minutes. Each composition was then removed from the mixer and cooled on a roll mill. Then each composition was mixed with curatives for the NBR (2 parts of HVA-2 [m-phenylenebismaleimide from du Pont] per 100 parts of NBR and 1 part Dicup 40C [40% di-p-cumylperoxide from Hercules] per 100 parts of NBR), Maglite D magnesium oxide and Zinc oxide (5 and 2.5 phr respectively, based on total polymer). The compositions were finally cured under pressure in a mold for 30 minutes at 180° C.

The final cured samples were evaluated in the same manner as in Example 1. Recipes, dynamic vulcanization temperatures and test results are summarized in Table IV.

The results set forth in Table IV indicate, generally, that higher levels of ACM elastomer give excellent stability against the effects of ozone, with all of the compositions containing 50% or more ACM elastomer showing excellent resistance to ozone.

Increased levels of filler, generally produce compositions with higher hardness and better hot-air aging resistance.

Compared with the compositions of Example 1, the compositions of Example 2 showed some advantages and some disadvantages. The silica-filled stocks which were dynamically vulcanized by diamine generator, and then finally vulcanized by perioxide with bismaleimide performed better than did the carbon-black filled stocks which were dynamically vulcanized by soap-sulfur and then finally vulcanized by sulfur in the presence of accelerator, with respect to dry-heat resistance. The temperature of potential use was about 25 centigrade degrees higher in the case of the silica-filled stocks. However, with respect to ultimate strength-related properties, the black-filled stocks gave the better performance. With respect to hot-oil resistance and set resistance as measured by the room-temperature tension set test, the silica-filled stocks performed about the same as did the carbon-black filled stocks.

All of the compositions which were prepared for these Examples were relatively easy to process although there was some tendency for sticking to the roll mill. At the higher levels of silica and ACM, there was some tendency towards cracking at the edges of the milled sheets.

TABLE IV

| Sample | ACM/NBR | Filler, Phr ACM | Filler, Phr NBR | Vulc. Temp., °C. | Shore A | U.T., MPa | 100% Modulus, MPa | U.E. % | Ten. Set, % | 72 hrs @ 150° C. Oil Swell, % | 72 hrs @ 150° C. Hardness Change | 72 hrs @ 150° C. U.E. Retained, % | Ozone Resistance, Hrs. |
|---|---|---|---|---|---|---|---|---|---|---|---|---|---|
| 1 | 40/60 | 20 | 30 | 203 | 55 | 12.7 | 2.2 | 363 | 3.5 | 29.0 | 12 | 46 | 171 |
| 2 | 40/60 | 30 | 20 | 204 | 55 | 13.3 | 2.1 | 393 | 4.5 | 29.1 | 15 | 53 | 245 |
| 3 | 40/60 | 30 | 40 | 211 | 62 | 13.2 | 3.1 | 296 | 4 | 30.4 | 14 | 61 | 107 |
| 4 | 40/60 | 40 | 30 | 203 | 62 | 15.4 | 3.0 | 372 | 3 | 27.8 | 14 | 53 | 109 |
| 5 | 50/50 | 10 | 50 | 199 | 60 | 12.5 | 2.0 | 446 | 4 | 28.3 | 5 | 78 | >304 |
| 6 | 50/50 | 20 | 20 | 197 | 51 | 8.9 | 1.5 | 405 | 5.5 | 28.2 | 13 | 52 | >304 |

TABLE IV-continued

| Sample | ACM/NBR | Filler, Phr ACM | Filler, Phr NBR | Vulc. Temp., °C | Shore A | U.T., MPa | 100% Modulus, MPa | U.E. % | Ten. Set, % | 72 hrs @ 150° C. Oil Swell, % | 72 hrs @ 150° C. Hardness Change | 72 hrs @ 150° C. U.E. Retained, % | Ozone Resistance, Hrs. |
|---|---|---|---|---|---|---|---|---|---|---|---|---|---|
| 7  | 50/50 | 20 | 40 | 200 | 53 | 12.4 | 1.9 | 392 | 4.5 | 25.3 | 15 | 69 | >304 |
| 8  | 50/50 | 20 | 60 | 198 | 68 | 14.1 | 2.4 | 394 | 3   | 26   | 5  | 78 | >304 |
| 9  | 50/50 | 30 | 30 | 204 | 65 | 10.4 | 2.1 | 363 | 3   | 29.8 | 5  | 93 | >304 |
| 10 | 50/50 | 30 | 50 | 198 | 69 | 14.2 | 2.8 | 364 | 4.5 | 24.5 | 4  | 74 | >304 |
| 11 | 50/50 | 40 | 20 | 203 | 55 | 11.7 | 2.1 | 379 | 3.5 | 21.2 | 16 | 67 | 299  |
| 12 | 50/50 | 40 | 40 | 212 | 61 | 14.3 | 2.8 | 394 | 4.5 | 25.6 | 15 | 63 | 299  |
| 13 | 50/50 | 40 | 60 | 203 | 76 | 14.8 | 3.2 | 426 | 4   | 24.4 | 5  | 67 | >304 |
| 14 | 50/50 | 50 | 50 | 203 | 77 | 14.8 | 3.0 | 509 | 4.5 | 22.4 | 6  | 58 | >304 |
| 15 | 60/40 | 20 | 50 | 200 | 60 | 9.8  | 1.9 | 352 | 5   | 30   | 5  | 86 | >304 |
| 16 | 60/40 | 30 | 20 | 202 | 52 | 8.8  | 1.7 | 418 | 4   | 33.4 | 15 | 71 | >304 |
| 17 | 60/40 | 30 | 40 | 202 | 54 | 10.8 | 2.0 | 377 | 5   | 25.1 | 16 | 72 | >304 |
| 18 | 60/40 | 30 | 60 | 196 | 67 | 12.0 | 2.3 | 421 | 2.5 | 26.3 | 6  | 70 | >304 |
| 19 | 60/40 | 40 | 30 | 211 | 54 | 10.3 | 2.1 | 395 | 4.5 | 22.3 | 16 | 64 | >304 |
| 20 | 60/40 | 40 | 50 | 201 | 70 | 11.4 | 2.4 | 415 | 5   | 25.6 | 5  | 76 | >304 |

Since the ACM can be completely vulcanized during the dynamic vulcanization stage of the mixing process, the usual post-curing associated with ACM technology is not necessary. Also, since the continuous or external phase is NBR, the prevulcanized millable composition exhibits processability more similar to that of NBR than to that of ACM. Sticking and splitting on the roll mill is less of a problem after dynamic vulcanization than before dynamic vulcanization.

EXAMPLE 3

In a similar manner, compositions are prepared combining acrylic elastomers with hydrogenated NBR, with fluoroelastomers, with silicone elastomers and with fluorosilicone elastomers. In each case, dynamic vulcanization of the acrylic elastomer in a matrix of the other elastomer produces a millable, vulcanizable combination which can be further compounded and fully vulcanized to produce useful articles which combine the good properties of their constituent elastomers and overcome, to a certain extent, the negative effects of technological incompatibility between them.

Although the invention has been illustrated by typical example, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A millable, vulcanizable elastomeric composition comprising 5-75 parts by weight of (A) an elastomer polymer from one or more alkyl acrylate monomers and another monomer containing carboxyl, chlorine, epoxy or hydroxy crosslinking sites and, correspondingly, 95-25 parts by weight of (B) another elastomeric polymer which is nitrile rubber, hydrogenated nitrile rubber, a fluoroelastomer, a silicone rubber or a fluorosilicone rubber, wherein (A) is in the form of vulcanized or crosslinked particles of average diameter below 50 micrometers.

2. The composition of claim 1 comprising 25-65 parts by weight of (A) and, correspondingly, 75-35 parts by weight of (B), in which the particles of (A) have an average diameter below 20 micrometers.

3. The composition of claim 2 wherein (B) is nitrile rubber or hydrogenated nitrile rubber.

4. The composition of claim 3 wherein (A) is a copolymer from one or more alkyl acrylate monomers together with another monomer containing chlorine crosslinking sites.

5. The composition of claim 3 comprising 40-60 parts by weight of (A) and, correspondingly, 60-40 parts by weight of (B), in which the particles of (A) have an average diameter below 10 micrometers.

6. The composition of claim 3 in which the particles of (A) have an average diameter below 5 microns.

7. The composition of claim 3 wherein B is nitrile rubber.

8. The composition of claim 5 which contains carbon black or silica filler.

9. The composition of claim 2 wherein (B) is a fluoroelastomer.

10. A method for preparing a millable, vulcanizable elastomeric composition by the steps of:
 i) forming a mixture comprising 5-75 parts by weight of (A) one or more elastomeric polymers from alkylacrylate monomer and another monomer containing carboxyl, chlorine, epoxy or hydroxy crosslinking sites and, correspondingly, 95-25 parts by weight of (B) another elastomeric polymer which is nitrile rubber, hydrogenated nitrile rubber, a fluoroelastomer, a silicone rubber or a fluorosilicone rubber and, ii) masticating the mixture at vulcanization temperature for (A) in the presence of an agent which preferentially vulcanizes (A) for a time sufficient to achieve at least partial vulcanization of (A).

11. The method of claim 10 with the additional subsequent steps of admixing a vulcanizing agent for B, and shaping and vulcanizing the mixture.

12. The product of the method of claim 11.

* * * * *